June 15, 1971   M. A. BREEN   3,584,382
COMBINATION KNIFE AND COMESTIBLE HOLDER
Filed Nov. 25, 1968   2 Sheets-Sheet 1
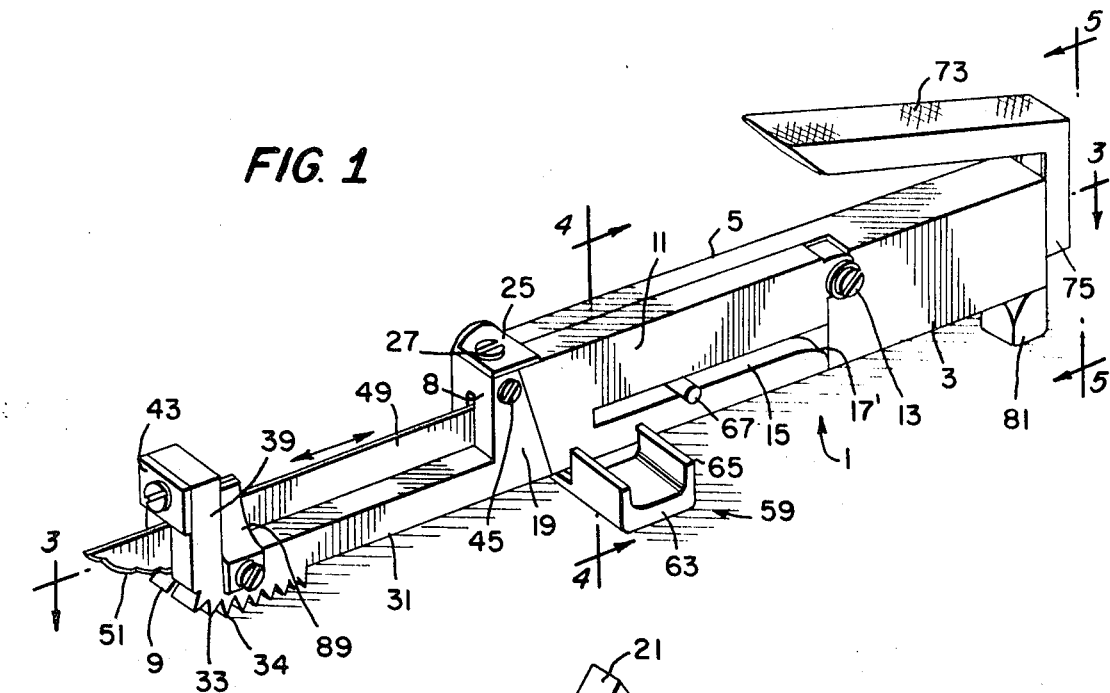
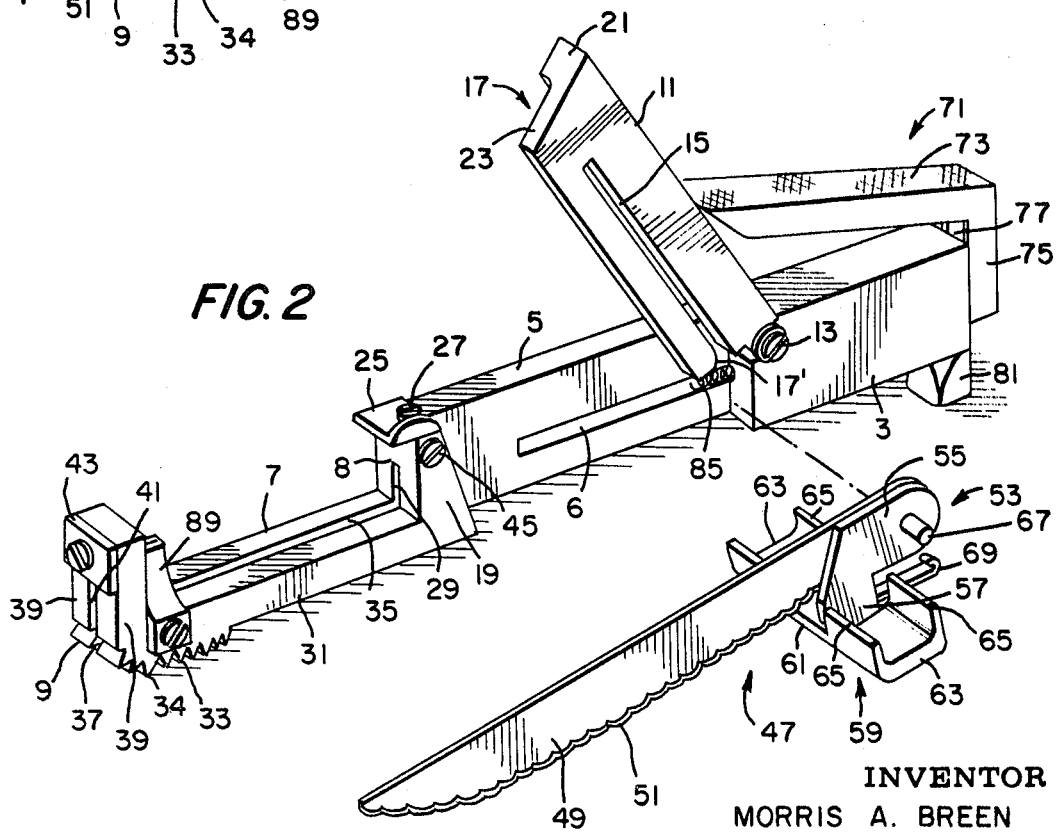
INVENTOR
MORRIS A. BREEN
BY
Peck & Peck
ATTORNEYS June 15, 1971   M. A. BREEN   3,584,382
COMBINATION KNIFE AND COMESTIBLE HOLDER
Filed Nov. 25, 1968   2 Sheets-Sheet 2
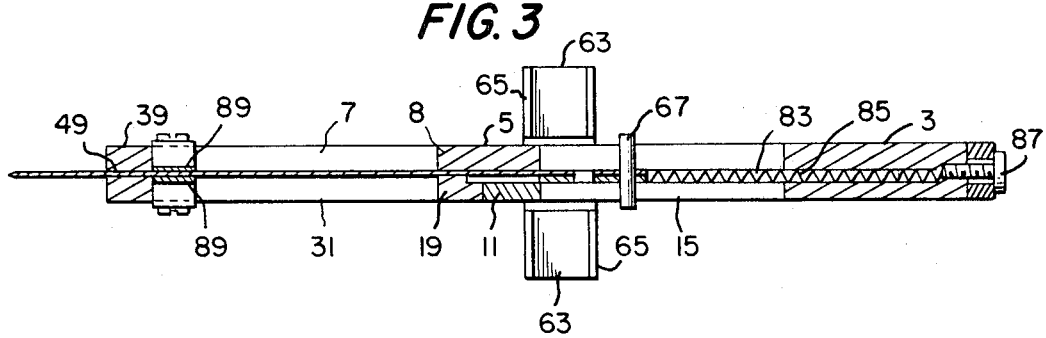
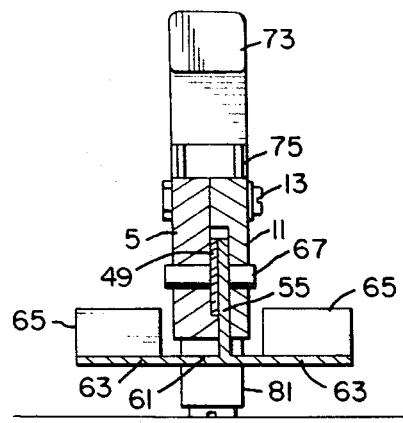
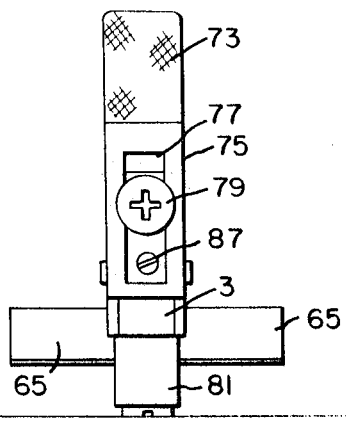
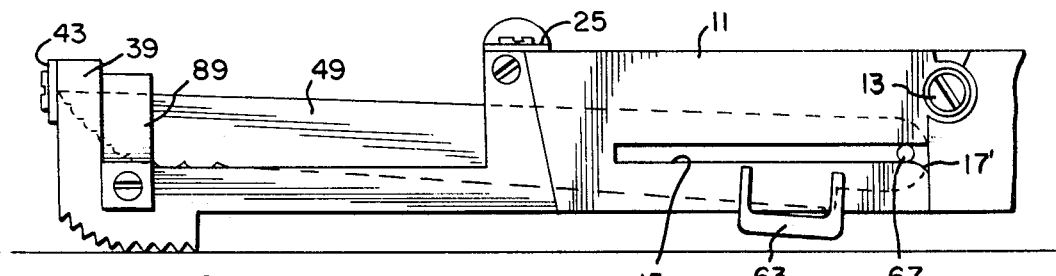
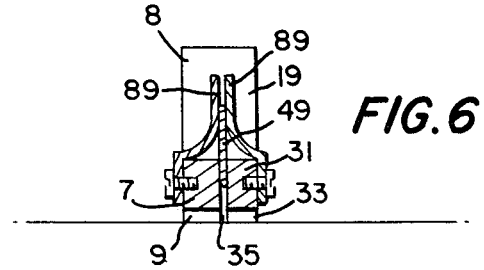
INVENTOR
MORRIS A. BREEN
BY Pech & Pech
ATTORNEYS United States Patent Office 3,584,382
Patented June 15, 1971

3,584,382
COMBINATION KNIFE AND COMESTIBLE HOLDER
Morris A. Breen, 109 Phillips St., Fulton, N.Y. 13069
Filed Nov. 25, 1968, Ser. No. 778,590
Int. Cl. B26b 29/02
U.S. Cl. 30—294                    9 Claims

ABSTRACT OF THE DISCLOSURE

Combination knife and comestible holder, a cutting blade reciprocable between a pair of spaced apart comestible holders, means connected to said blade for manually causing cutting reciprocation thereof and the knife providing a body portion which is accessible for cleaning.

---

This invention relates broadly to the cutting arts, and in its more specific aspects it relates to a combination knife and comestible holder particularly adapted for use by persons having only one operative hand; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

A substantial number of persons have only one hand which they may use in the normal fashion, the other hand or arm having been amputated or is not useable in a conventional manner, due to a variety of infirmities, and it is for such persons that my invention has been especially designed. It will be evident, for instance, that a person with only one operative hand will experience great difficulties in cutting food for eating. It is customary, for instance, in the cutting of meat for the consumer to maintain the meat in the proper position for cutting, by means of a work held in one hand, and to cut such meat by means of a knife in the other hand. It is, of course, impossible for one having only one operative hand to hold a fork in one hand and a knife in the other for the operation of the latter to cut the meat or other comestible, or the like.

My invention has eliminated the problems which persons having only one operative hand have encountered in the past in attempting to cut comestibles for consumption. I have provided a comestible cutting and holding implement by which, with the use of only one hand, a person may hold the comestible to be cut and cause reciprocation of a knife thereover for cutting the comestible to the desired size for eating. In the development of this combination knife and comestible holder, I have provided an implement which is easy to use, and the operating means for causing reciprocation of the knife is conveniently disposed for activation by two fingers of the user, and the knife has been particularly designed for ease of holding, handling and operating. With very little practice the invention may be used with facility by any person having only one operative hand.

It will be recognized that in an implement of this character it is highly desirable, if not necessary, to provide means for gaining access to the interior of any substantially enclosed part of the knife, and it is also highly desirable and advantageous that such means be easily operable from normal closed position to open position for cleaning. I have provided such easily operable means so that the implement may be maintained in a clean and sanitary condition.

As a safety precaution, and also to prevent damage to the cutting edge of the knife, I have provided an arrangement whereby the knife blade may be expeditiously positioned in an inoperative position so that the cutting edge of the knife is removed from a position where a user or handler of the implement might be cut, and also to a position where the cutting edge is fully protected from damage.

It has been one of my purposes, in the design and construction of this combination knife and comestible holder, to provide an implement which is sturdy in design and will require no maintenance, with the exception of the cleaning thereof, and will be relatively inexpensive and non-complex to produce.

While I shall describe my invention as being used to cut comestibles, it is to be recognized, and it is within my contemplation, that this cutting knife may be used to cut, slice or saw materials other than comestibles.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 1 is a view in perspective of the combination knife and comestible holder.

FIG. 2 is a view similar to FIG. 1, but showing the knife body closure member in open position for cleaning of the interior thereof, and is also a partly exploded view showing the knife assembly removed from its operative position in the implement.

FIG. 3 is a view taken on the line 3—3 of FIG. 1.

FIG. 4 is a view taken on the line 4—4 of FIG. 1.

FIG. 5 is a view taken on the line 5—5 of FIG. 1.

FIG. 6 is a vertical sectional view showing the knife blade in inoperative protected position.

FIG. 7 is a view in side elevation, with parts thereof broken away, illustrating the blade in retracted position protecting the blade, and removing the blade from position where it might cause injury or damage.

In the accompanying drawings, I have used the numeral 1 to designate in its entirety the body of the combination knife and comestible holder, and the numeral 3 to designate the butt or handle portion of the knife. A forwardly projecting plate or arm 5 extends from one side of the butt 3, and the plate or arm is of reduced thickness relative to the butt, but is of substantially the same width. The plate or arm 5 is provided with a closed end slot 6 therein.

Extending forwardly from the lower portion of the plate or arm 5 is an arm 7 which is of reduced width relative to plate or arm 5 and on its forward end provides an arcuately shaped serrated portion 9, which is adapted to enage, and along with a further arcuate serrated portion (to be described) to hold the comestible being cut.

A cover plate 11 is pivotally mounted to the butt 3, as at 13, and the cover plate 11 is provided with a slot 15 therein, which is closed at its forward end and opens through the rear end of the cover plate 11, and at its front end is notched at 17, the base or bottom of the rear end of slot 15 being arcuately curved downwardly and rearwardly, as particularly illustrated at 17′ in the drawings, the purpose of which will be hereinafter described. When the cover plate 11 is in closed operative position, as illustrated in FIG. 1 of the drawings, the slot 15 is in the same horizontal plane width, and is oppositely disposed to, the slot 6 in the plate or arm 5, and the forward end or edge 17 of the cover plate 11 slidably engages the abutment 19, which comprises a lateral extension of the forward portion of the plate or arm 5. Consideration of FIG. 2 of the drawings clearly shows that the pivotally mounted cover plate 11 is formed so as to provide a thickened upper portion 21, and a thickness reduced lower portion 23, so that when the cover plate 11 is in closed operative position the thickened upper portion 21 thereof will be in sliding abutment with the plate or arm 5, while the lower reduced thickness portion 23 will be spaced from the inner surface of the plate or arm 5, the purpose of this construction will become apparent as this description proceeds.

I provide a latching plate 25 which is mounted on the top of the abutment 19 by means of a screw 27 for swiveling movement on the abutment. By turning the latching plate 25 into the position illustrated in FIG. 1, a portion of the latching plate will extend over the upper edge of the cover plate 11 to maintain it in operative closed position. The screw 27 is threaded to proper tightness so that plate 25 may be manually turned to the position of FIG. 1 and to the open position of FIG. 2.

The abutment 19 which is preferably, though not necessarily formed integral with the plate or arm 5 is spaced from the forward surface 8 of plate 5 forming an upwardly extending slot 29, and the abutment 19 is provided with a forwardly extending arm 31 which functions as a supporting member having the arcuate serrated comestible maintaining surface 33 which is formed on the forward end of the arm 31. The arms 31 and 7 are spaced from each other leaving an area 35 therebetween and the pair of arcuately spaced comestible maintaining means 9 and 33 are likewise spaced apart providing an area 37 therebetween. At the forward upper ends of each arcuately spaced maintaining means 9 and 33 are a pair of uprights 39 which are likewise spaced apart forming a slot-like space 41 therebetween, and extending across the top of this space 41, I provide a plate 43 which is fixed to the uprights 39 in any suitable manner.

It will now be apparent that the arms 31 and 7 which carry on their ends the serrated maintaining means 9 and 33 are spaced apart and are of a length so that each of the maintaining means is spaced forwardly from the body 1 of the combination knife and comestible holder. The pair of uprights 39 are preferably though not necessarily integrally formed with the arms 7 and 31, and consideration of the drawings discloses that each serrated maintaining means extends a distance rearwardly on the bottom of each arm and then curves upwardly and is formed a distance on each upright. This presents a pair of spaced apart arcuate maintaining surfaces, and the advantages of the construction will become apparent hereinafter.

The arcuate maintaining means 9 and 33 are preferably serrated so as to provide a plurality of transverse maintaining ribs 34.

A set screw 45 may be provided in the upper part of the abutment 19 which upon being screwed therein engages the screw 27 to prevent it from turning, to thereby maintain the screw at the proper position permitting manual turning of plate 25, as described.

In FIG. 2 of the drawings the knife and sliding knife actuating means assembly has been illustrated in position removed from its normal operative position within the body of the knife, and I have used the numeral 47 to designate this knife and actuating means in its entirety. The assembly provides a knife blade 49 having a cutting edge 51, which in this instance is shown as being of serrated construction, however it is to be understood that a straight cutting edge may be used. At the rear end of the knife I have fixed thereto in any suitable manner, what I shall term a plow and I have designated this in its entirety by the numeral 53. Such plow includes a body portion 55 which is fixed in any suitable manner to the rear end of the knife blade and is provided with a depending portion 57 which depends below the cutting edge of the knife. Fixed in any sutiable manner to the lower edge of the depending portion 57 of the plow is a transversely extending member, designated in its entirety by the numeral 59, and this transversely extending member 59 provides the actuating means for causing reciprocation of the knife 49 in the cutting operation. The member 59, as will be apparent from FIG. 2 of the drawings, extends below the cutting edge 51 of the knife, as at 61, and on each side of the portion 61 is a finger receiving well-like element 63 each of which elements is provided with upstanding front and rear walls 65 to provide a sound fit for the fingers in the operation of the knife. Extending transversely through the portion 55 of the plow 53, and through the knife, is a pin 67, and this pin 67 projects from each side of the knife as is clearly shown in FIG. 4 of the drawings. The pin 67 is fixed in its illustrated position as a guide and supporting means for the knife in its reciprocatory cutting action, as will be explained hereafter. Fixed to the portion 61 of the member 59 is a rearwardly extending spring finger 69, the purpose of which will be explained as this description of my invention proceeds.

The assembly, including plow 53, member 59 and pin 67, comprises what I shall term, a sliding unit or assembly.

The numeral 71 designates, generally, a hand accommodating means which is adjustably fixed to the rear end surface of the butt 3. This hand accommodating member 71 embodies a forwardly extending portion 73, from the rear end of which downwardly depends a section 75 which is slotted as at 77 so that its position relative to the butt 3 may be adjusted by means of a large headed screw 79 which screws into the rear end surface of the butt 3. By adjusting the section 75 up or down, the forwardly extending handle portion 73 will be positioned at the desired distance from the butt 3. Fixed to, and depending from the lower rear surface of the butt 3, is a stop 81 which functions to keep the fingers from slipping when the knife is being operated, in a manner as will be described.

The butt 3 is provided with a bore 83 therethrough which extends from the front to the rear thereof, and a spring 85 is positioned in this bore and the spring is adjusted by means of a set screw 87 which is threadedly mounted in the rear end of the butt 3 and is in engagement with the spring 85. At the forward ends of the arms 7 and 31, rearwardly of the uprights 39, I affix a pair of spring clips 89 in position with respect to the area 35 so that when the spring clips 89 are forced apart, in a manner as will be described, the space between them will be in the same vertical plane as the area 35.

When the assembly 47, which includes the knife and the sliding unit, is assembled in the implement as disclosed in FIG. 1 of the drawings, it will be seen that the pin 67 which extends through the plow and the knife will extend into the guide slots 6 and 15 in the plate 5 and the pivotally mounted cover 11, respectively. With the assembly so mounted the knife 49 will extend forwardly through the abutments 8 and 19, between the arms 7 and 31 in the area 35, between the spring clips 89, and the end of the knife will project outwardly into the space 41 between the uprights 39.

In order to operate the combination knife and comestible holder the user thereof preferably grasps the implement with the portion 73 of the hand accommodating handle 71 against the palm of his hand, with the index and middle fingers extending forwardly on each side of the implement, and one finger being disposed in one manually operated element 63 and the other finger in the other manually operated element 63. The little finger of the hand is preferably disposed against the stop element 81. The implement is then positioned with the serrated maintaining means 9 and 39 in holding engagement with the comestible to be cut, the implement being held at an angle to the horizontal which is the most convenient for the user. With the comestible being so held and the implement disposed at the desired diagonal angle relative to the horizontal, and the index and middle fingers being disposed in the manually operated means 63, the index and middle fingers are actuated to reciprocate the operating unit, and hence the knife, forwardly and rearwardly of the implement, such sliding action being guided by the projection of the pin 67 in the two oppositely disposed slots 6 and 15. The spring 85 is of a length so that the forward end thereof abuts the rear end of the plow 53 and the rear end of the knife, when the sliding unit is in rearward position but spaced from the rear end of the slots, so that upon further retraction of the sliding unit and the knife the spring 85 is compressed and upon moving the sliding unit and knife forwardly the spring urges and abets such forward movement for a portion of such movement.

The spring finger 69 is positioned on the member 59 so that it slidably bears against the bottom of the plate member 5, and thus, keeps the knife from falling to far downwardly from between the arms 7 and 31.

When the knife is not in use the knife blade may be locked between the spring clips 89 in the following manner. The sliding unit is retracted to its fully retracted position and then the knife is forced upwardly so that it extends between the spring clips 89 and is releasably maintained therebetween. The plate 43 maintains the knife in this retracted upper position, preventing forward movement thereof. It will now be apparent that with the knife so maintained between the spring clips 89 (see FIG. 7), the blade will be out of position where it cannot injure a handler of the implement, and the cutting edge of the knife will be protected against damage. It is within my contemplation to provide rollers associated with the spring clips to increase the knife holding friction and to aid in the insertion of the blade between the clips.

When it is desirable to pivot the cover plate 11 upwardly into the position illustrated in FIG. 2 of the drawings so that the area between the plates 5 and 11 may be cleaned as well as the slots and other mechanisms operable therein, the sliding unit and knife are fully retracted until that end of the pin 67 which extends through the slot 15 is in position above the notch 17, the latching plate 25 having been swivelled into unlatching position, whereupon the cover plate 11 is pivoted upwardly, the portion of the pin extending in the slot of the cover plate being received in the notch 17 so that the cover plate may be pivoted upwardly for the cleaning operation.

It will now be recognized that I have evolved a combination knife and comestible holder wherein the knife is mounted for reciprocable cutting action and also for limited pivotal movement.

I claim:

1. A combination knife and comestible holder including in combination, a body, comestible holding means connected to said body and spaced therefrom and a knife, an actuating means therefor reciprocally and pivotally mounted in said body, said knife being reciprocably operable adjacent to said comestible holding means and said actuating means includes at least one manually operated element extending laterally outward and substantially perpendicular with respect to said body.

2. A combination knife and comestible holder in accordance with claim 1, wherein said body is provided with a free area therein in which said knife is reciprocably and pivotally disposed and a portion of said actuating means is reciprocably and pivotally disposed therein.

3. A combination knife and comestible holder in accordance with claim 1, wherein said body is provided with oppositely disposed slots therein and said actuating means and knife are provided with a pin extending therethrough and therebeyond and fixed thereto, the portions of said pin on each side of said knife and actuating means extending into said slots for sliding movement therein.

4. A combination knife and comestible holder in accordance with claim 2, wherein said body includes a pivotally mounted element which in normal operating position is positioned adjacent the remainder of said body, and in inoperative pivoted open position permits access to said free area in the body.

5. A combination knife and comestible holder in accordance with claim 3, wherein said body includes a pivotally mounted element which in normal operating position is positioned adjacent the remainder of said body and in inoperative pivoted open position permits access to said free area in the body, and one of said slots is formed in said pivotally mounted element, and said one of said slots is closed at its rearward end, and means is provided at the open end of the slot for accommodating said pin when the pivotally mounted element is in inoperative pivoted open position.

6. A combination knife and comestible holder in accordance with claim 5, wherein the lower edge of the rear open end of said slot is curved downwardly to receive said pin when the pivotally mounted element is in inoperative pivoted open position.

7. A combination knife and comestible holder in accordance with claim 2, wherein a compression spring extends into said body and is in engagement with the rear end of said actuating means for biasing said actuating means forwardly.

8. A combination knife and comestible holder in accordance with claim 1, wherein a pair of spaced apart arms extend forwardly from said body and a comestible holding means is provided on the lower surfaces of each of said arms adjacent the forward ends thereof and on a portion of the forward ends of said arms, said knife being reciprocal between said arms and said comestible holding means.

9. A combination knife and comestible holder in accordance with claim 8, wherein knife clamping means are fixed to said spaced apart arms for receiving and releasably locking the knife therebetween in inoperative position.

References Cited

UNITED STATES PATENTS

| | | | |
|---|---|---|---|
| 1,232,042 | 7/1917 | Johnston | 30—166 |
| 2,018,908 | 10/1935 | Allen | 30—166 |
| 2,227,844 | 1/1941 | Roche | 30—166X |
| 2,520,000 | 8/1950 | Deftman | 30—394X |

GRANVILLE, Y. CUSTER, Jr., Primary Examiner